United States Patent [19]
Pieh et al.

[11] Patent Number: 4,707,508
[45] Date of Patent: Nov. 17, 1987

[54] LONG-SHELFLIFE CONCENTRATED AQUEOUS SOLUTIONS OF MELAMINE-FORMALDEHYDE CONDENSATES, PREPARATION AND USE THEREOF

[75] Inventors: Stefan Pieh, Leonding; Johann Krammer, Linz, both of Austria

[73] Assignee: Chemie Linz Aktiengesellschaft, Linz, Austria

[21] Appl. No.: 913,236

[22] Filed: Sep. 30, 1986

[30] Foreign Application Priority Data

Oct. 4, 1985 [DE] Fed. Rep. of Germany ....... 3535501

[51] Int. Cl.$^4$ ............................................. C08L 61/22
[52] U.S. Cl. .................................... 524/106; 524/105; 524/597; 524/598; 524/843; 525/509
[58] Field of Search ............... 524/598, 843, 106, 105; 528/252; 525/509, 597

[56] References Cited

U.S. PATENT DOCUMENTS 3,985,696 10/1976 Aignesberger et al. ........ 524/843 X

FOREIGN PATENT DOCUMENTS 2725078 12/1978 Fed. Rep. of Germany .
3248586 12/1982 Fed. Rep. of Germany .

Primary Examiner—Theodore E. Pertilla
Attorney, Agent, or Firm—Wenderoth, Lind & Ponack

[57] ABSTRACT

Concentrated aqueous solutions of sulfo-containing melamine-formaldehyde condensates containing hydantoin derivatives to prolong their shelf life.

These melamine-formaldehyde condensates are predominantly used as additives in inorganic binders to improve their flow and strength properties.

10 Claims, No Drawings

LONG-SHELFLIFE CONCENTRATED AQUEOUS SOLUTIONS OF MELAMINE-FORMALDEHYDE CONDENSATES, PREPARATION AND USE THEREOF

DESCRIPTION

The invention relates to such concentrated aqueous solutions of sulfo-containing melamine-formaldehyde condensates as, to increase their shelf life, contain hydantoin derivatives, and to the preparation and use thereof.

Such condensates are preferably used as additives in inorganic binders, such as, for example, cement or anhydrite, to improve their processing or end-use properties, such as, for example, fluency, rate of hardening or strength. These resins are predominantly used in the form of aqueous solutions which, without stabilizing additives, have a sufficiently long shelf life only in a concentration of up to about 20%. On increasing the solids concentration, the shelf life decreases to an ever greater extent, so that for example 40% strength solutions, the use of which is advantageous in particular on account of the lower cost of transport and storage, are usable only for a short time.

German Offenlegungsschrift No. 3,248,586 discloses sulfonated melamine-formaldehyde resin solutions with an addition of a cyclic lactam and/or of a substituted or unsubstituted benzenesulfonamide, the shelf life of which in 40% strength aqueous solution at 40° C. is between 12 and 24 weeks, as against only six weeks without additives.

U.S. Pat. No. 3,985,696 describes sulfonated melamine-formaldehyde resin solutions which, without stabilizing additives, have a shelf life, even as 30% to 50% strength aqueous solutions, which corresponds to that of a 20% strength solution.

This effect is achieved by maintaining certain condensation conditions and by following the first alkaline and acid condensation with an additional further alkaline condensation stage in which the initially relatively high molecular weight condensate of the second stage is degraded down to an accurately defined viscosity.

A melamine-formaldehyde resin which has no sulfo groups and only limited solubility in water, which is used as an impregnating resin for decorative papers for the surface coating of derived timber product boards, and which contains, as a modifying agent for improving the water and weathering resistance and also the crack resistance of the hardened resin films, 1% to 20% by weight of 5,5-dimethylhydantoin, is described in German Offenlegungschrift No. 2,725,078.

The hitherto disclosed additives for prolonging the shelf life of concentrated melamine-formaldehyde resin solutions are insufficiently active in practical use.

It has now been found, unexpectedly, that sulfo-containing concentrated melamine-formaldehyde resin solutions, in particular those having a resin content of 30% or more, have, on addition of a hydantoin derivative during or after the condensation, a significantly improved shelf life compared with known resin solutions.

The invention accordingly provides long-shelflife concentrated aqueous solutions of sulfo-containing melamine-formaldehyde condensates having a content of hydantoin derivatives of the formula (I)

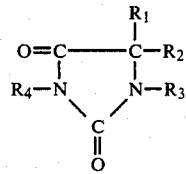

in which $R_1$ and $R_2$ independently of each other denote hydrogen or an alkyl radical having at most 10 C atoms, $R_4$ denotes hydrogen, an alkylol radical having at most 4 C atoms or an aminocarbonylalkyl radical having 0 to 3 C atoms in the alkyl moiety and $R_3$ denotes hydrogen, an alkylol radical having at most 4 C atoms, an aminocarbonylalkyl radical having 0 to 3 C atoms in the alkyl moiety or a radical of the formula (II)

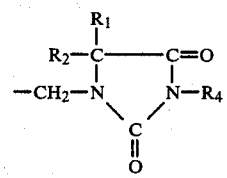

in which $R_1$, $R_2$ and $R_4$ are as defined in the formula (I).

The hydantoin derivative is added to the melamine-formaldehyde condensate for example in an amount of 0.1 to 20 mol %, preferably in an amount of 0.5–10 mol %, based on melamine. A content of 1 to 5 mol % is particularly preferred.

Since the problem of insufficient shelf life generally only appears in the case of melamine resin solutions having a concentration of over 20%, the stable melamine resin solutions of the invention are chiefly used in concentrations of appreciably over 20%, preferably 30% or more. For practical use, an upper limit of about 50% strength solutions results, which, however, naturally cannot rule out that the stabilizing effect of the hydantoin derivative is present even in the case of more highly concentrated solutions.

It has been found to be advantageous to use melamine-formaldehyde condensates where the molar ratio of formaldehyde to melamine is within the range from 2.5:1 to 4:1.

It is possible for example to use hydantoin derivatives in which $R_1$ and $R_2$, independently of each other, denote hydrogen, a methyl, ethyl, propyl, butyl, isobutyl, pentyl or hexyl radical, $R_3$ and $R_4$, independently of each other, denote hydrogen, a methylol, ethylol, propylol or butylol radical, an aminocarbonylalkyl radical having 0–3 C atoms in the alkyl moiety, such as, for example, the formamide, acetamide, propionamide or butyramide radical. The hydantoin derivatives can also be present in dimeric form in which the respective N-1 atoms of the hydantoin are bonded to one another by methylene groups and the radicals $R_1$, $R_2$ and $R_4$ have the above meanings. On account of its easy accessibility and high action, 5,5-dimethylhydantoin is particularly preferred.

The long-shelflife melamine resin solutions of the invention are in principle preparable by any process known for such resins. Preferably they are obtained by means of a two-stage condensation of the corresponding amounts of melamine, formaldehyde and an alkali metal sulfite, in which the first stage comprises heating at a pH of 8–12 until sulfite is no longer detectable. The second stage, after addition of an acid and, if desired, the hydantoin derivative, comprises condensing at pH 3-7 until the desired degree of condensation is present. The degree of condensation is measured for example by measuring the efflux viscosity by DIN 53211 at 50° C. When using a 4 mm nozzle, the efflux viscosity is in general between 10 and 30 seconds and is dependent upon the nature of the resin. The condensation is continued in each case until optimal fluency is obtained in the case of a binder mixture modified with the resulting resin. A pH of 7-13 is then set with an alkali, and if the hydantoin derivative has not been added before, it is added now. The melamine resin solutions obtained can be used either as such or after evaporation in a spray dryer as a solid powder.

The melamine resins of the invention are preferably added as liquefying additives to inorganic binders, such as, for example, cement, anhydrite, gypsum, kaolin, fly ash, magnesia cement or puzzolans, improving their flow properties. On the other hand, it is possible, by adding these additives, to obtain a binder mixture having the same flow properties while using less water, the result of which is then to increase the strength of the hardened building material.

The hydantoin derivatives used according to the invention are partly commercial products and/or are prepared for example as described in Austrian Pat. No. 353,283 or Kirk-Othmer, Encyclopedia of Chemical Technology, Third Edition, Volume 12 (1980), pages 692-711.

The shelf life of the resin solutions of the invention has been quoted in Examples 1 to 6 in terms of the storage time in days after which the viscosity, as measured by DIN 53,211 at 20° C. in the 4 mm efflux cup, has increased to a value of 195 seconds. Above this value, the handling and processability of the resin solutions are already much more difficult owing to the high viscosities.

In Examples 7 to 22 the shelf life has been indicated by measuring the viscosity figure obtained at 20° C. in seconds, after 92 days, in accordance with DIN 53,211 in the 4 mm efflux cup or in the 6 mm efflux cup (Examples 20 and 20A).

The present invention is explained in more detail in the examples below, the hydantoin derivatives listed in Table 1 having been used by way of example.

TABLE 1

| Hydantoin derivatives used | |
|---|---|
| H | hydantoin |
| MH | 5-methylhydantoin |
| DMH | 5,5-dimethylhydantoin |
| MEH | 5,5-methylethylhydantoin |
| MBH | 5,5-methylisobutylhydantoin |
| DMMH | 5,5-dimethyl-3-methylolhydantoin |
| DMDM | 5,5-dimethyl-1,3-dimethylolhydantoin |
| DMDP | 5,5-dimethyl-1,3-dipropionamidohydantoin |
| BDMH | 1,1'-bis(5,5-dimethylhydantoinyl)methane |
| BDMM | 1-(5,5-dimethylhydantoinyl)-1'-(5,5-dimethyl-3-methylolhydantoinyl)methane |
| BDME | 1-(5,5-dimethylhydantoinyl)-1'-(5,5-dimethyl-3-ethylolhydantoinyl)methane |

EXAMPLE 1

In a glass reactor equipped with stirrer, thermometer and reflux condenser, 238 parts of water, 126 parts of melamine, 248.2 parts of 36.3% strength formalin and 95.05 parts of sodium disulfite, corresponding to a molar ratio of melamine:formaldehyde:disulfite of 1:3:1, brought with 20% strength sodium hydroxide solution to pH 9.9, were heated to 75° C. and condensed at that temperature until sulfite was no longer detectable. Then the pH was adjusted to 6.3 by adding 60% strength formic acid, 3.84 parts of dimethylhydantoin, corresponding to an amount of 3 mol % based on melamine, were added and the pH was again brought to 6.3. This was followed by condensation at 75° C. until a viscosity of 22 seconds at 50° C., measured in the 4 mm efflux cup (DIN 53,211) was obtained. Then the pH was adjusted to 8.5 by adding 20% strength sodium hydroxide solution, and the reaction mixture was cooled down. The solids content of the resulting resin solution was 41.6% by weight, and its viscosity at 20° C. was 47 seconds. After a storage time of 120 days at 25° C., the viscosity had risen to a value still just acceptable for satisfactory processing, namely 195 seconds, measured at 20° C. in the 4 mm efflux cup by DIN 53,211. On storage at 50° C., the viscosity of 195 seconds was reached after as short a time as 20 days.

COMPARATIVE EXAMPLE 1A

The method of Example 1 was used to prepare a resin solution, but without the addition of a hydantoin derivative. A 41.5% strength resin solution having a viscosity at 20° C. of 53 seconds was obtained. The permissible viscosity value of 195 seconds was reached in only 17 days of storage at 25° C., and after 30 days the resin was solid. On storing at 50° C., the 195-seconds viscosity was reached in only seven days.

EXAMPLES 2-6

Resin solutions were prepared analogously to Example 1, except that different hydantoin derivatives, as indicated in Table 2, were added. Table 2 also lists the concentrations, the viscosities at 50° C. and 20° C. and the shelf lives of the resulting resin solutions, measured in days to reaching a viscosity of 195 seconds in accordance with DIN 53,211.

TABLE 2

| (Molar ratio melamine:formaldehyde:disulfite = 1:3:1) | | | | | |
|---|---|---|---|---|---|
| Example | Hydantoin derivative[1] (3 mol %) parts by wt. | Concentration (%) | Viscosity (sec) 20° C. | 50° C. | Shelf life at 25° C. (days) |
| 1A | — | — | 41.5 | 53 | 22 | 17[2] (7 at 50° C.) |
| 1 | DMH | 3.84 | 41.6 | 47 | 22 | 120 (20 at 50° C.) |
| 2 | DMMH | 4.74 | 41.6 | 41 | 21 | 120 |
| 3 | MBH | 5.10 | 41.6 | 46 | 22 | 94 |
| 4 | MEH | 4.27 | 41.6 | 42 | 21 | 90 |
| 5 | MH | 3.06 | 41.2 | 36 | 19 | 116 |
| 6 | DMDM | 5.65 | 41.2 | 36 | 19 | 120 |

[1]Abbreviation explained in Table 1
[2]Solid after 30 days

EXAMPLE 7

In an apparatus analogous to Example 1, 256.7 parts of water, 126 parts of melmine (1 mole), 258.7 parts of 36.3% strength formalin (3.13 moles) and 107.4 parts of sodium disulfite (1.13 moles) were brought to pH 9.9 with 20% strength sodium hydroxide solution, heated to 75° C. and condensed until sulfite was no longer detectable. The pH was then adjusted to 6.2 by adding 50% strength formic acid, 1.28 parts (0.01 mole) of dimethylhydantoin, correspondiqg to an amount of 1 mole % based on melamine, were added and the pH was again brought to 6.2. This was followed by condensation at 75° C. until a viscosity of 14 seconds, measured by DIN 53,211 at 50° C. in the 4 mm efflux cup, was obtained. The reaction mixture was then brought to pH 9.0 by means of 20% strength sodium hydroxide solution and cooled down. The concentration, viscosity and shelf life at 25° C. (indicated as viscosity in accordance with DIN 53,211 in seconds at 20° C. in the 4 mm efflux cup after 92 days of storage) of the resulting resin solution are given in Table 3.

TABLE 3

(Molar ratio melamine:formaldehyde:disulfite = 1:3.13:1.13)

| Example | Hydantoin derivative Type | Mol % | Parts | Concentration (%) | Viscosity (sec) 20° C. | Viscosity (sec) 50° C. | Shelf life (25° C.) Viscosity after 92 days (sec/20° C.) |
|---|---|---|---|---|---|---|---|
| 7A | — | — | — | 41.3 | 26 | 16 | 69 |
| 7 | DMH | 1 | 1.28 | 41.4 | 20 | 14 | 34 |
| 8 | DMH | 3 | 3.84 | 41.3 | 25 | 15 | 30 |
| 9 | DMH | 4 | 5.13 | 41.4 | 23 | 14 | 25 |
| 10 | DMH | 5 | 6.41 | 41.6 | 20 | 14 | 23 |
| 11 | DMH | 7 | 8.97 | 41.3 | 20 | 14 | 22 |
| 12[1] | DMH | 3 | 3.84 | 40.9 | 19 | 14 | 24 |
| 13 | H | 3 | 3.00 | 41.3 | 24 | 15 | 25 |
| 14 | BDMH | 3 | 8.05 | 41.3 | 26 | 16 | 32 |
| 15 | BDMM | 3 | 8.95 | 41.3 | 23 | 16 | 27 |
| 16 | BDME | 3 | 9.37 | 41.3 | 24 | 15 | 28 |
| 17 | DMDP | 3 | 8.11 | 41.3 | 26 | 15 | 66 |
| 18 | DMH | 20 | 25.6 | 41.0 | 17 | 14 | 19 |
| 19 | DMH | 10 | 12.8 | 41.2 | 19 | 14 | 21 |
| 20 | DMH | 3 | 3.84 | 45.0 | 79 | 27 | 32[2] |
| 20A | — | — | — | 45.0 | 100 | 27 | 105[2] |

[1] Addition of DMH after completed acid condensation
[2] Measured in the 6 mm efflux cup

EXAMPLE 7A

A resin solution was prepared in analogy to Example 7, but without addition of a hydantoin derivative. Concentration, viscosity and shelf life are given in Table 3.

EXAMPLES 8–17

Resin solutions were prepared analogously to Example 7, except that—as indicated in Table 3—different hydantoin derivatives and different concentrations of hydantoin derivatives were used. In Example 12, the dimethylhydantoin was only added after the condensation had ended. Concentration, viscosity and shelf life at 25° C. of the resulting resin solutions are likewise given in Table 3.

EXAMPLE 18

In an apparatus analogous to Example 1, 256.7 parts of water, 126 parts of melamine (1 mole), 258.7 parts of 36.3% strength formalin (3.13 moles) and 107.4 parts of sodium disulfite (1.13 moles) were brought to pH 8 with 50% strength formic acid, heated to 60° C. and condensed until sulfite was no longer detectable. The pH was then adjusted to 3 by adding 50% strength formic acid, 25.6 parts of dimethylhydantoin (20 mole % based on melamine) and 32.5 parts of water were added and the pH was again brought to 3. This was followed by condensation at 60° C. until a viscosity of 14 seconds, measured by DIN 53,211 at 50° C. in the 4 mm efflux cup, was obtained. The reaction mixture was then brought to pH 7 by means of 20% strength sodium hydroxide solution and cooled down. The concentration, viscosity and shelf life at 25° C. (indicated as viscosity in accordance with DIN 53,211 in seconds at 20° C. in the 4 mm efflux cup after 92 days of storage) of the resulting resin solution are given in Table 3.

EXAMPLE 19

In an apparatus analogous to Example 1, 256.7 parts of water, 126 parts of melamine (1 mole), 258.7 parts of 36.3% strength formalin (3.13 moles) and 107.4 parts of sodium disulfite (1.13 moles) were brought to pH 12 with 20% strength sodium hydroxide solution, heated to 95° C. and condensed until sulfite was no longer detectable. The pH was then adjusted to 7 by adding 50% strength formic acid, 12.8 parts of dimethylhydantoin (10 mole % based on melamine) and 16.3 parts of water were added and the pH was again brought to 7. This was followed by condensation at 95° C. until a viscosity of 14 seconds, measured by DIN 53,211 at 50° C. in the 4 mm efflux cup, was obtained. The reaction mixture was then brought to pH 13 by means of 20% strength sodium hydroxide solution and cooled down. The concentration, viscosity and shelf life at 25° C. (indicated as viscosity in accordance with DIN 53,211 in seconds at 20° C. in the 4 mm efflux cup after 92 days of storage) of the resulting resin solution are given in Table 3.

EXAMPLE 20

In an apparatus analogous to Example 1, 179 parts of water, 126 parts of melamine (1 mole), 258.7 parts of 36.3% strength formalin (3.13 moles) and 107.4 parts of sodium disulfite (1.13 moles) were brought to pH 9.9 with 20% strength sodium hydroxide solution, heated to 75° C. and condensed until sulfite was no longer detectable. The pH was then adjusted to 6.3 by adding 50% strength formic acid, 3.84 parts (0.03 mole) of dimethylhydantoin, corresponding to an amount of 3 mole % based on melamine, were added and the pH was again brought to 6.3. This was followed by condensation at 75° C. until a viscosity of 27 seconds, measured by DIN 53,211 at 50° C. in the 4 mm efflux cup, was obtained. The reaction mixture was then brought to pH 9.2 by means of 20% strength sodium hydroxide solution and cooled down. The concentration, viscosity and shelf life (indicated as viscosity in accordance with DIN 53,211 in seconds at 20° C. in the 6 mm efflux cup after 92 days of storage at 25° C.) of the resulting resin solution are given in Table 3.

EXAMPLE 20A

A resin solution was prepared analogously to Example 20, except that no hydantoin derivative was added. Concentration, viscosity and shelf life (viscosity in accordance with DIN 53,211 in the 6 mm efflux cup) are given in Table 3.

EXAMPLE 21

Two resin solutions were prepared analogously to Example 1, except that 126 parts of melamine (1 mole), 214.9 parts of 36.3% strength formalin (2.60 moles), 107.4 parts of sodium disulfite (1.13 moles) and 264.4 parts of water were used, once with 3.84 parts (3 mole %) of dimethylhydantoin and once without addition of any hydantoin derivative. The acid condensation took place at pH 6.2. Condensation was continued to a viscosity of 14 seconds measured at 50° C., and finally the resin solution was brought to pH 9.

The improvement in shelf life of the resin solution due to the addition of dimethylhydantoin is clear from the following tabulation:

|  | Concentration (%) | Viscosity (sec) 20° C. | Viscosity (sec) 50° C. | Shelf life (25° C.) (Viscosity after 92 days) (sec/20° C.) |
|---|---|---|---|---|
| 3 mol % of DMH | 42.2 | 16 | 14 | 17 |
| no additive | 40.6 | 17 | 14 | 19 |

EXAMPLE 22

Two resin solutions were prepared analogously to Example 1, except that 126 parts of melamine (1 mole), 289.3 parts of 36.3% strength formalin (3.5 moles), 107.4 parts of sodium disulfite (1.13 moles) and 246.4 parts of water were used, once with 3.84 parts (3 mole %) of dimethylhydantoin and once without addition of any hydantoin derivative. The acid condensation took place at pH 5.5. Condensation was continued to a viscosity of 14 seconds measured at 50° C. finally the pH was brought to 9.

The concentration, viscosity and shelf life of the two resin solutions can be seen from the following tabulation:

|  | Concentration (%) | Viscosity (sec) 20° C. | Viscosity (sec) 50° C. | Shelf life (25° C.) (Viscosity after 92 days) (sec/20° C.) |
|---|---|---|---|---|
| 3 mol % of DMH | 41.2 | 20 | 14 | 219 |
| no additive | 40.9 | 20 | 14 | gel |

EXAMPLE 23

The liquefying action of the resin solutions according to the invention in the case of approximately equal final strengths was demonstrated by means of an anhydrite screed:

50 parts of natural anhydrite were premixed dry with 50 parts of aggregate (round grain 0–4 mm), 14.5 parts of water in which 0.25 part of $Na_2SO_4$ and 0.725 part of the resin solution of Example 8 had been dissolved were added, and mixed thoroughly for 90 seconds.

The same method was used to prepare an anhydrite mixture without adding the liquefier of the invention.

To demonstrate the water-saving effect on using the resin of the invention and the much higher final strengths obtainable therewith for approximately the same flow properties, the method was also used to prepare a further anhydrite mixture, without liquefier but with 21 parts of water.

The three mixtures were subjected to measurements of the fluency and also the bend strength and the compressive strength of the hardened screed after 28 days.

To determine the fluency, a Vicat ring (DIN 1164, sheet 5) which was resting on a horizontal glass plate was filled with the mixture to the brim and pulled away upwards. The diameter of the resulting round flat dough cake in cm was taken as a measure of the fluency.

The determination of the bend and compressive strength was carried out on 4×4×16 cm prisms (DIN 1164, sheet 7) after 28 days.

The following values were obtained for fluency and strengths:

|  | Water-anhydrite ratio | Fluency (cm) | Bend strength 28 days (MPa) | Compressive strength 28 days (MPa) |
|---|---|---|---|---|
| 0.725 part of resin solution | 0.29 | 23.0 | 4.34 | 21.6 |
| No additive | 0.29 | 10.5 | 4.41 | 18.4 |
| No additive | 0.42 | 20.0 | 2.23 | 7.80 |

EXAMPLE 24

The liquefying action of the resin of the invention for approximately the same final strength was demonstrated on the following concrete mixture:

In a 65-liter Eirich forced circulation mixer, 7.04 kg of cement PZ 275 H (Perlmooser Zement, Kirchbichl Works) were premixed for 30 seconds with the dried aggregate (round grain from Holzleithen near Linz: 20.23 kg of 0–4 mm, 7.95 kg of 4–8 mm, 6.18 kg of 8–16 mm and 9.71 kg of 16–32 mm), 2.59 kg of water were added, followed after a further 30 seconds of mixing by a further 1.30 kg of water, followed by one minute of mixing, addition of 46 g of the resin solution of Example 8 (0.65% by weight of resin solution based on cement), and one minute of stirring.

The same method was used to make up a concrete mixture where the resin solution was replaced as liquefier by 20 g of powder which was obtained by spray-drying the resin solution of Example 8. The solid liquefier content was 0.28% by weight, based on cement.

The same method was also used to prepare a further concrete mixture without addition of the liquefying resin of the invention. One minute after completing the mixing process the fluency was measured on all three concrete mixtures as a measure of spread in cm in accordance with DIN 1048, sheet 1. The compressive strength was measured after 18 hours and after 28 days, likewise in accordance with DIN 1048, sheet 1, on test cubes measuring 15 cm along the edge.

The following measurements of fluency and strength were obtained:

| 300 kg of Zement PZ 275 H/m³ concrete Water-cement value: 0.55 | | | |
|---|---|---|---|
| | Fluency | Compressive strength (MPa) | |
| | (cm) | 18 h | 28 d |
| 0.65% resin solution | 59.5 | 13.4 | 41.1 |
| 0.28% solid resin | 60.0 | 13.2 | 40.9 |
| no additive | 35.5 | 12.5 | 40.0 |

We claim:

1. Long-shelflife concentrated aqueous solutions of sulfo-containing melamine-formaldehyde condensates having a content of hydantoin derivatives of the formula (I)

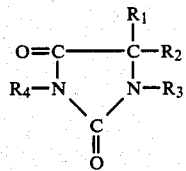

in which $R_1$ and $R_2$ independently of each other denote hydrogen or an alkyl radical having at most 10 C atoms, $R_4$ denotes hydrogen, an alkylol radical having at most 4 C atoms or an aminocarbonylalkyl radical having 0 to 3 C atoms in the alkyl moiety and $R_3$ denotes hydrogen, and alkylol radical having at most 4 C atoms, and aminocarbonylalkyl radical having 0 to 3 C atoms in the alkyl moiety or a radical of the formula (II)

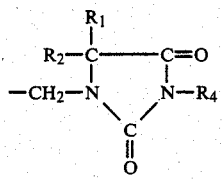

in which $R_1$, $R_2$ and $R_4$ are as defined in the formula (I) said aqueous solution of condensates being produced by a process which comprises condensing melamine, formaldehyde and alkali metal sulfite in aqueous solution in a two stage reaction, A pH of 8-12 being maintained in the first stage, a pH of 3-7 being maintained in the second stage and finally a pH of 7-13 being set, the hydantoin derivative being added at any desired time in the condensation process.

2. Solutions as claimed in claim 1, wherein the hydantoin derivative content is 0.1 to 20 mol %.

3. Solutions as claimed in claim 2, wherein the hydantoin derivative content is 0.5 to 10 mol %.

4. Solutions as claimed in claim 3, wherein the hydantoin derivative content is 1 to 5 mol %.

5. Solutions as claimed in claim I, which are present in a concentration of 30 to 50 % by weight.

6. Solutions as claimed in claim 1, wherein the molar ratio of formaldehyde to melamine is 2.5:1 to 4:1.

7. Solutions as claimed in claim 1, wherein the hydantoin derivative is 5,5-dimethylhydantoin.

8. A method for improving the flow properties of inorganic binders which comprises adding to said binders sulfo-containing melamine formaldehyde condensate having a content of hydantoin derivative of the formula (I)

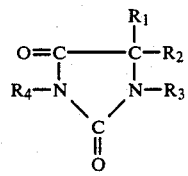

in which $R_1$ and $R_2$ independently of each other denote hydrogen or an alkyl radical having at most 10 C atoms, $R_4$ denotes hydrogen, and alkylol radical having at most 4 C atoms or an aminocarbonylalkyl radical having 0 to 3 C atoms in the alkyl moiety and $R_3$ denotes hydrogen, and alkylol radical having at most 4 C atoms, an aminocarbonylalkyl radical having 0 to 3 C atoms in the alkyl moiety or a radical of the formula (II)

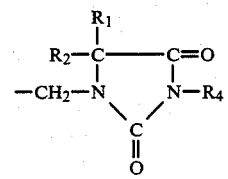

in which $R_1$, $R_2$ and $R_4$ are as defined in the formula (I), said condensate being produced by a process which comprises condensing melamine, formaldehyde and alkali metal sulfite in aqueous solution in a two stage reaction, of pH of 8-12 being maintained in the first stage, a pH of 3-7 being maintained in the second stage and finally a pH of 7-13 being set, the hydantoin derivative being added at any desired time in the condensation process.

9. The method according to claim 8 wherein said condensate is in the form of a spray-dried powder of an aqueous solution.

10. The method according to claim 8 wherein said condensate is in the form of an aqueous solution.

* * * * *